US 8,655,091 B2

(12) United States Patent
Robinson et al.

(10) Patent No.: US 8,655,091 B2
(45) Date of Patent: Feb. 18, 2014

(54) BASIS VECTOR SPECTRAL IMAGE COMPRESSION

(75) Inventors: Ian S. Robinson, Redondo Beach, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/404,925

(22) Filed: Feb. 24, 2012

(65) Prior Publication Data

US 2013/0223752 A1 Aug. 29, 2013

(51) Int. Cl.
*G06K 9/46* (2006.01)
(52) U.S. Cl.
USPC ............. 382/244; 341/50; 382/131; 382/191; 382/232; 382/234; 382/253; 382/260; 600/473; 703/2
(58) Field of Classification Search
None
See application file for complete search history.

(56) References Cited

U.S. PATENT DOCUMENTS

| | | | |
|---|---|---|---|
| 6,075,891 A | 6/2000 | Burman | |
| 6,167,156 A | 12/2000 | Antoniades et al. | |
| 6,701,021 B1 * | 3/2004 | Qian et al. | 382/253 |
| 6,750,964 B2 | 6/2004 | Levenson et al. | |
| 6,782,138 B1 | 8/2004 | Leisner et al. | |
| 6,798,360 B1 * | 9/2004 | Qian et al. | 341/50 |
| 6,804,400 B1 | 10/2004 | Sharp | |
| 6,859,275 B2 | 2/2005 | Fateley et al. | |
| 6,940,999 B2 | 9/2005 | Lin | |
| 6,952,499 B1 | 10/2005 | Vititoe | |
| 7,180,588 B2 | 2/2007 | Geshwind et al. | |
| 7,194,111 B1 | 3/2007 | Schaum et al. | |
| 7,251,376 B2 * | 7/2007 | Qian et al. | 382/253 |
| 7,356,201 B2 | 4/2008 | Gunther et al. | |
| 7,463,778 B2 | 12/2008 | Damera-Venkata | |
| 7,486,734 B2 | 2/2009 | Machida | |
| 7,680,337 B2 | 3/2010 | Gruninger et al. | |
| 7,773,828 B2 | 8/2010 | Sakata et al. | |
| 7,907,784 B2 * | 3/2011 | Gladkova et al. | 382/232 |

(Continued)

FOREIGN PATENT DOCUMENTS

CN 101763445 6/2010

OTHER PUBLICATIONS

Barbara Penna et al: "Transform Coding Techniques for Lossy Hyperspectral Data Compression", IEEE Transactions on Geoscience and Remote Sensing, May 1, 2007, vol. 45, No. 5, IEEE Service Center, Piscataway, NJ, US.

(Continued)

*Primary Examiner* — Tsung-Yin Tsai
(74) *Attorney, Agent, or Firm* — Pierce Atwood LLP; Joseph M. Maraia (57) ABSTRACT

Computer implemented methods for compressing 3D hyperspectral image data having a plurality of spatial pixels associated with a hyperspectral image, and a number of spectral dimensions associated with each spatial pixel, include receiving, using a processor, the 3D hyperspectral image data, a set of basis vectors associated therewith, and either a maximum error amount or a maximum data size. The methods also include partitioning the 3D hyperspectral image data into a plurality of 2D images, each associated with one of the number of spectral dimensions, and an associated one of the set of basis vectors. The methods additionally include ranking the set of basis vectors if not already ranked. The methods may further include iteratively applying lossy compression to the 2D images, in an order determined by the ranking. Other embodiments and features are also disclosed.

6 Claims, 4 Drawing Sheets

(56) References Cited

U.S. PATENT DOCUMENTS

| | | | |
|---|---|---|---|
| 8,107,747 B2* | 1/2012 | Qian et al. | 382/234 |
| 8,150,195 B2* | 4/2012 | Demirci et al. | 382/260 |
| 8,165,344 B2 | 4/2012 | Shirasaka | |
| 8,175,393 B2 | 5/2012 | Robinson et al. | |
| 8,315,472 B2 | 11/2012 | Robinson et al. | |
| 8,374,682 B2* | 2/2013 | Freeman et al. | 600/473 |
| 8,391,961 B2 | 3/2013 | Levenson et al. | |
| 2002/0146160 A1* | 10/2002 | Parker et al. | 382/131 |
| 2003/0012398 A1 | 1/2003 | Sunshine et al. | |
| 2004/0218172 A1 | 11/2004 | DeVerse et al. | |
| 2006/0247514 A1 | 11/2006 | Panasyuk et al. | |
| 2009/0018801 A1* | 1/2009 | Gladkova et al. | 703/2 |
| 2009/0074297 A1* | 3/2009 | Robinson | 382/191 |
| 2010/0303371 A1 | 12/2010 | Robinson et al. | |
| 2012/0224782 A1 | 9/2012 | Robinson et al. | |
| 2012/0263382 A1 | 10/2012 | Robinson et al. | |

OTHER PUBLICATIONS

Qian Du et al: "Anomaly-Based Hyperspectral Image Compression", Geoscience and Remote Sensing Symposium, 2008. IGARSS 2008. Jul. 7, 2008, pp. 11-974, ISBN: 978-1-4244-2807-6 IEEE International, IEEE, Piscataway, NJ, USA.

Carvajal, G. et al: "Unified Lossy and Near-Lossless Hyperspectral Image Compression Based on JPEG 2000", IEEE Geoscience and Remote Sensing Letters, Oct. 1, 2008, vol. 5, No. 4, pp. 593-597, ISSN: 1545-598X, IEEE Service Center, New York, NY, US.

A. Kaarna et al: "Transform Based Lossy Compression of Multispectral Images", Pattern Analysis & Applications, Mar. 27, 2001, vol. 4, No. 1, pp. 39-50, ISSN: 1433-7541.

John A. Saghri et al: "Practical Transform Coding of Multispectral Imagery," IEEE Signal Processing Magazine, Jan. 1, 1995, vol. 12, No. 1, pp. 32-43, ISSN: 1053-5888.

Lopez, O., et al: "Impact of rate control tools on very fast non-embedded wavelet image encoders" Visual Communications and Image Processing, Jan. 30, 2007, figure 3, San Jose.

Robinson, "Comparison of Hyperspectral Sub Pixel Detection with and without Prior Knowledge of Target Features," Aerospace Conference, 1998 IEEE Snowmass at Aspen, Colorado, Mar. 21-28, 1998, vol. 5, pp. 183-189; XPO10287059; ISBN 978-0-7803-4311-5.

International Preliminary Report on Patentability, dated Aug. 29, 2011 of PCT/US2010/024192 filed Feb. 12, 2010.

Sun et al., "Improved iterative error analysis for endmember extraction from hyperspectral imagery," SPIE Imaging Spectrometry XIII, vol. 7086, pp. 400-407, Intro., Sec. 2.2—pp. 3-5 (Aug. 2008).

Rogge, et al., "Iterative spectral unmixing for optimizing per pixel endmember sets," IEEE Transactions on Geoscience and remote sensing, IEEE Service Center, vol. 44, No. 12, pp. 3725-3736 (Dec. 2006).

Veganzones, et al., "Endmember extraction methods: a Schrot review" pp. 400-407 (Sep. 2008).

Duran, et al., "A time efficient method for anomaly detection in hyperspectral images," IEEE transactions on geoscience and remote sensing, IEEE Service Center, vol. 45, No. 12, pp. 3894-3904 (Dec. 2007).

Plaza, et al., "A new approach to mixed pixel classification of hyperspectral imagery based on extended morphological profiles," Pattern Recognition, Elsevier, vol. 37, No. 6, pp. 1097-1116 (Jun. 2004).

Plaza, et al., "Spatial/Spectral endmember extraction by multidimensional morphological operations," IEEE Transactions on Geoscience and Remote Sensing, IEEE Service Center, NJ, US vol. 40, No. 9, pp. 2025-2041 (Sep. 2002).

Rogge, "Integration of spatial-spectral information for the improved extraction of endmembers," Remote Sensing of Environment, Elsevier, vol. 110, No. 3, pp. 387-303 (Aug. 2007).

Filippi, et al., "Support vector machine-based endmember extraction," IEEE Transactions on Geoscience and Remote Sensing, IEEE Service Center, NJ, US, vol. 47, No. 3, pp. 771-791 (Mar. 2009).

International Search Report and Written Opinion, dated Apr. 27, 2011 of PCT/US2010/024192 filed Feb. 12, 2010.

PCT/US2010/024192 filed Feb. 12, 2010 Partial International Search Report, Feb. 21, 2011.

Keshava, "Spectral Unmixing," IEEE Signal Processing Magazine, vol. 19, 2002.

International Search Report for International Patent Application No. PCT/US2008/083738 dated Feb. 9, 2009.

Kuybeda, et al., "Global Unsupervised Anomaly Extraction and Discrimination in Hyperspectral Images via Maximum Orthogonal-Complements Analysis," Feb. 2008, Department of Electrical Engineering Tecnion IIT, Haifa, 32000 Israel, retrieved from internet<URL: http://webee.technion.ac.il/uploads/file/publication/684.pdf.

Manolakis, et at, "Is there a best hyperspectral detection algorithm?" SPIE Newsroom, pp. 1-3, 2009.

Bayazit, "Region adaptive spectral transformation for Wavelet Based color image compression," Image Processing (CIP), 2009 16th IEEE International Conference on, IEEE, Piscataway, NJ, Nov. 7, 2009, pp. 2817-2820, sec. 2 and 3.

Dohyun, et al., "Rate distortion optimized image compression using generalized principal component analysis," Acoustics, Speech and Signal Processing, 2006 IEEE ICASSP 2006 Proceedings, 2006 IEEE International conference on Toulouse, France, 14-19, May 14, 2006, pp. 5-8.

Memarsadeghi, et al., "A fast implementation of the isodata clustering algorithm," IJCGA vol. 17, No. 1, pp. 71-103, 2007.

Wei, et al., "Empirical comparison of fast clustering algorithms for large data sets," Proceedings of the 33rd Hawaii International conference on system sciences, pp. 1-10, 2000.

Yan et al., "Fast approximate spectral clustering," KDD 2009, 9 pages, Jun. 28-Jul. 1, 2009, Paris, France.

Meza, et al., "Applied non-uniformity correction algorithm for striping noise removal in hyperspectral images," downloaded from the internet: http://nuc.die.udec.cl/publications/papers/2010-NUCStrippingNoise.pdf on Nov. 20, 2012.

Jiang, et al., "A robust estimation of virtual dimensionality in hyperspectral imagery," 2010 International Conference on computational problem solving, pp. 374-378, Dec. 3-5, 2010.

Harsanyi, et al., "Hyperspectral image classification and dimensionality reduction: an orthogonal subspace projection approach," Zeee TMNS on Geoscience and Remote Sensing, 32(4), Jul. 1994.

Neville, et al., "Automatic endmember extraction from hyperspectral data for mineral exploration," 4th International Airborne remote sensing conference exhibition/21st Canadian symposium on remote sensing, pp. 891-896, 1999.

Orthogonality and Least Squares, http://www.aerostudents.com/files/linearAlgebra/orthogonalityLeastSqures.pdf, Jul. 2009.

Duarte, et al, "Structured compressed sensing from theory to applications," IEEE transactions in Signal Processing, IEEE Service Center, New York, vol. 59, No. 9, Sep. 1, 2011.

Pickering, et al., "Compression of hyperspectral data using vector quantisation and the discrete cosine transform," Image Processing, 2000, Proceedings, 2000 International Conference of Sep. 10-13, 2000, IEEE, Piscatawey, NJ, Sep. 10, 2000, pp. 195-198, vol. 2.

Manolakis, et al., "Hyperspectral Image Processing for automatic target detection applications," http://cis.rit.edu/cnspci/references/dip/manolakis2003.pdf.

Leathers, et al., "Scene-based nonuniformity corrections for optical and SWIR pushbroom sensors," Optics Express, 13(13):5136-5150 (Jun. 27, 2005).

Winter, "Comparison of approaches for determining end-members in hyperspectral data," IEEE 2000.

Plaza, et al., "A quantitative and comparative analysis of endmember extraction algorithms from hyperspectral data," IEEE 2004.

Boardman, et al., "Mapping target signatures via partial unmixing of aviris data," Citeseer 1995.

(56) References Cited

OTHER PUBLICATIONS

Winter, "N-FINDR: an algorithm for fast autonomous spectral endmember determination in hyperspectral data," SPIE 1999.

Cook, "Onboard HSI Compression Algorithms," Hyperspectral Compression Workshop; 17 pages (2003).

Ramakrishna et al.; "Spectral/Spatial Hyperspectral Image Compression," Hyperspectral Data Compression; [Edited by: G. Motta, F. Rizzo and J. Storer] [Springer-Verlag]: pp. 309-346 (2006).

Romines; "Hyperspectral Image Compression with Optimization for Spectral Analysis," MS Thesis, University of Washington: pp. i-40 (2006).

* cited by examiner

BASIS VECTOR SPECTRAL IMAGE COMPRESSION

CROSS-REFERENCE TO RELATED APPLICATIONS

This application is related to U.S. patent application Ser. No. 13/371,160, entitled "System and Method for Hyperspectral Image Compression," filed Feb. 10, 2012, U.S. patent application Ser. No. 13/085,883, entitled "Optimized Orthonormal System and Method for Reducing Dimensionality of Hyperspectral Images," filed Apr. 13, 2011, U.S. patent application Ser. No. 12/475,145, entitled "System and Method for Reducing Dimensionality of Hyperspectral Images," filed May 29, 2009, and U.S. patent application Ser. No. 11/856,588, entitled "Hyperspectral Image Dimension Reduction System and Method," filed Sep. 17, 2007, the disclosures of each of which are hereby incorporated by reference in their entireties.

BACKGROUND

This disclosure relates to compression of hyperspectral image data, based on an optimized set of basis vectors. It may be understood that compression reduces the size of a data set, but typically result in a loss of access to information content. In some cases, certain data from the data set is irretrievably lost (i.e. lossy compression), while in other cases the entirety of the data is maintained (i.e. lossless compression). Although in some cases information from the data set may be readily accessed and utilized while the data set is in its reduced size (i.e. dimensionality reduction), it is generally understood that other compression techniques would require an additional decompression step in order to return the data to a usable form.

Hyperspectral sensors can collect image data across a multitude of spectral bands through a combination of technology associated with spectroscopy and remote imaging. Thus, such sensors can capture sufficient information to derive an approximation of the spectrum for each pixel in an image. In addition to having a color value, and intensity, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable. It may be appreciated that in some sensor platforms (such as those mounted on a drone or other mobile platform), direct data retrieval may be delayed by significant timescales as the mobile platform is gathering more data. As such, onboard processing and data reduction for advance transmission may facilitate preliminary or urgent data analysis.

Although the transmission rate for hyperspectral images can be increased using existing lossy and/or lossless compression techniques, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type of data than that which the algorithms were designed to compress. Thus, existing lossless compression algorithms do not provide a suitable guaranteed compression factor for hyperspectral images, and in certain cases, the decompressed data set may even be larger than the original data set.

It may be appreciated that a greater reduction of data size may be realized by a compression technique than by a dimensionality reduction technique. In some cases, the greater reduction in data size may outweigh the benefit of being able to process dimensionally reduced data. It may be appreciated, however, that once such data is compressed, an additional decompression step would generally be required in order to process the data. Although some compression techniques may be applied to hyperspectral image data directly, in some cases the hyperspectral image data may be dimensionally reduced prior to being further reduced in size through compression. It may be appreciated that such compression may allow for a greater reduction in data size, while still permitting faster processing of the most relevant data once it is decompressed. In the context of hyperspectral imaging, such processing generally means that the data is exploited for target detection, anomaly detection, material identification, classification mapping, or so on. In some cases, the dimensionally reduced hyperspectral data that may be further compressed may include a family of functions or a set of vectors whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers or basis vectors. While basis vectors span the data obtained from the image, and form a mathematical basis for the data, endmembers are pixels from an imaged scene (or extrapolations of pixels in the scene), that represent the spectra of a pure material found in the scene. In some cases, endmembers are derived such that they enclose or bound the data set (as in a hypervolume or a simplex).

Because dimensionally reduced data (DIMRED data) may be generated from hyperspectral image data (HSI data) processed using one or more of a variety of analysis techniques, it may be understood that compression of such DIMRED data may be performed as a post-processing technique subsequent to the dimensionality reduction process. As an example, compression post-processing techniques may be applied to the dimensionality reduced output of techniques such as those disclosed in the related applications incorporated by reference above, which compute geometric basis vectors. As another example, compression may also be applied to the dimensionality reduced outputs of other hyperspectral image processing mechanisms, including but not limited to Principal Components Analysis, which computes "statistically derived' basis vectors that span a scene in an optimal mean-square sense. Regardless, it may be appreciated that among other things, it is advantageous to increase the speed at which the dimensionality of hyperspectral images is reduced, improve reduction of data volume sizes, improve the spectral fidelity of hyperspectral image data to reduce large volumes of sensor data and/or identify and preserve unusual pixels and/or subtle spectral variations from compression.

SUMMARY

According to an embodiment, a computer implemented method for compressing 3D hyperspectral image data having a plurality of spatial pixels associated with a hyperspectral image, and a number of spectral dimensions associated with each spatial pixel, includes receiving, using a processor, the 3D hyperspectral image data, a set of basis vectors associated therewith, and a maximum error amount. The method also includes partitioning, using the processor, the 3D hyperspectral image data into a plurality of 2D images, each associated with one of the number of spectral dimensions, and an associated one of the set of basis vectors. The method additionally includes ranking, using the processor, the set of basis vectors if not already ranked. The method also includes iteratively applying a lossy compression to the plurality of 2D images using the processor, starting with 2D images associated with a lowest ranked basis vector, as compressed 2D images. The method additionally includes comparing, using the processor, an error associated with the compressed 2D images with the maximum error amount, to maximize an amount of volume compression within the maximum error amount. The method further includes setting aside, using the processor, pixels of the 2D images with errors exceeding the maximum error amount.

According to another embodiment, a computer implemented method for compressing 3D hyperspectral image data having a plurality of spatial pixels associated with a hyperspectral image, and a number of spectral dimensions associated with each spatial pixel, includes receiving, using a processor, the 3D hyperspectral image data, a set of basis vectors associated therewith, and a maximum data size. The method also includes partitioning, using the processor, the 3D hyperspectral image data into a plurality of 2D images, each associated with one of the number of spectral dimensions, and an associated one of the set of basis vectors. The method also includes ranking, using the processor, the set of basis vectors if not already ranked. The method also includes losslessly compressing, using the processor, each of the plurality of 2D images as losslessly compressed 2D images. If a data size of the losslessly compressed 2D images exceeds the maximum data size, the method additionally includes iteratively applying a lossy compression to the plurality of 2D images, using the processor, starting with 2D images associated with a lowest ranked basis vector, as lossy compressed 2D images, and further includes comparing, using the processor, a volume associated with the lossy compressed 2D images with the maximum data size, to minimize the number of lossy compressed 2D images within the maximum data size.

Other features of this disclosure and the inventive concept described herein will be apparent to those skilled in the art based on the following drawings and detailed description.

DETAILED DESCRIPTION

During many types of hyperspectral image processing, a set of basis vectors are generated which may be used to reduce the dimensionality of the hyperspectral image data by unmixing. Unmixing may be unconstrained unmixing or constrained so that unmixing coefficients are non-negative and/or sum to unity. In one or more preferred embodiments, unconstrained unmixing may be employed, as it is generally faster and simpler than other unmixing techniques, and the basis vectors derived are not intended to be endmembers. It may be appreciated that the number of basis vectors needed to accurately represent the hyperspectral image data may vary depending on the processing technique. For example, some processing techniques, such as Principal Components Analysis ("PCA"), compute a basis vector for every color of hyperspectral data (although not all are necessarily retained). In PCA in particular, "statistically derived" basis vectors that span a scene are computed. Such basis vectors may be optimized in a mean-square sense, however might not be an ability to control how well anomalies or unusual pixels are represented in some such embodiments. Additionally, in PCA, all basis vectors are simultaneously derived, before the dimensionality is reduced. In other processing techniques, such as that described in U.S. patent application Ser. No. 13/085,883, the number of basis vectors computed is a user-selectable variable. Additionally, in processing techniques such as that disclosed in U.S. patent application Ser. No. 13/085,883, as well as in U.S. patent application Ser. Nos. 12/475,145 and 11/856,588, scene-based geometric basis vectors may be computed. Such basis vectors may be computed to preserve subtle nuances of each pixel. As such, the basis vectors may be computed sequentially, while dimensionality is reduced. It may be appreciated that regardless of how many basis vectors are computed, this number may ultimately be reduced, so as to either minimize the amount of data retained (i.e. the volume of the reduced data) for a given error level, or to minimize the error level (i.e. the worst-case error or the root mean square "RMS" error between an unreduced pixel and its reduced counterpart) computed for any pixel for a given amount of data retained. It may be appreciated that the fewer basis vectors being retained, the greater the reduction/compression, however, the larger the error (in particular in the tails of the data). It is clear, however, that the full set of unreduced pixels is of a much greater data volume.

Methods are disclosed herein for compressing either original HSI data or the DIMRED data as compressed data.

Although in some embodiments the methods may be performed immediately following one or more processing techniques that generate an associated set of basis vectors, in other embodiments the methods may be performed as a separate process, at a later time, or on a separate computational system. In some embodiments, the one or more processing techniques that output the set of basis vectors or the DIMRED data are performed on a per-pixel basis (i.e. for each X,Y spatial location of the HSI or DIMRED data). The original HSI data will have C colors at each spatial location. The DIMRED data will comprise pixels with fewer than C elements at each X,Y spatial location, plus selected unreduced pixels that retain C colors. It may be appreciated that pixels in the scene that are reduced, are reduced by unmixing the original pixels with N basis vectors, as described below. The resulting unmixing coefficients form the elements of the DIMRED data, and may be used along with the N basis vectors to form an approximation of the original HSI data at each pixel.

In an embodiment, prior to one or more of the methods being performed, a user may select which method is to be run, by designating whether a maximum value is to be established for the compressed data volume or the compressed data error levels. Such a selection may be made by any appropriate mechanism, including but not limited to receiving a user input of the selection on a graphical user interface associated with a data processing system performing the methods. In other embodiments, the system may have associated therewith one of the methods, fixing either the maximum data volume or the maximum data error levels.

Figure 1:
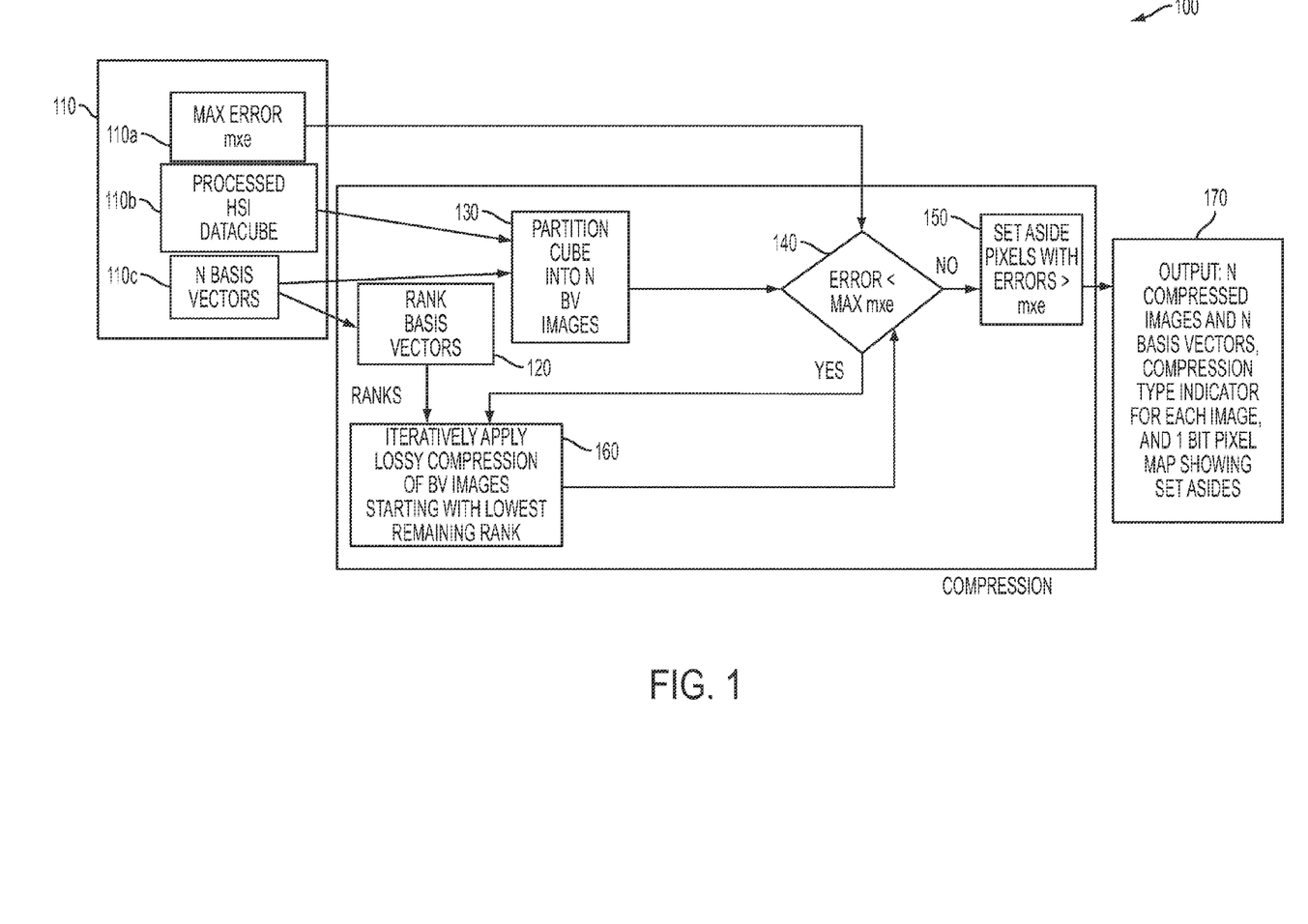
FIG. 1 illustrates an embodiment of a method for compressing dimensionally reduced data associated with a hyperspectral image, minimizing data size based on a maximum error level.

FIG. 1 illustrates an embodiment of method 100, configured to reduce the size of the DIMRED data into compressed data having a selected amount of worst case error. It may be appreciated that in other embodiments, other measurements of error may alternatively be utilized. For example, in an embodiment, the error may be at a given percentile of the data (including but not limited to being at the $99^{th}$ percentile). Regardless, and to be clear, where the user selects a maximum error level mxe, method 100 is configured to package the DIMRED data in a smaller compressed format, where the data size of the smaller format is minimized while the data itself is preserved within that error level mxe. Accordingly, in some embodiments method 100 may begin at 110 by receiving inputs associated therewith. It may be appreciated that in various embodiments the inputs received at 110 may be obtained from data files stored locally on a system associated with performing method 100, or may be stored remotely, such as on another system. In some embodiments, the inputs received at 110 may be received by a user interface associated with the system associated with performing the method 100, or may be received at a user interface on a remote system interfaced with the system performing the method 100. While in some embodiments all inputs received at 110 may be received simultaneously, in other embodiments, the inputs received at 110 may be received at various times throughout method 100, and may be called as needed, or a prompt requesting a user input may be presented via the user interface at various times while performing the method 100.

As shown in FIG. 1, in an embodiment receiving the inputs at 110 may include at 110a receiving the maximum error level mxe. The maximum error level mxe may be input utilizing any appropriate measurement, including but not limited to being a percent of data degradation as a result of lossy compression. Additionally, receiving the inputs at 110 may include at 110b receiving a processed HSI data cube comprising the DIMRED data, and at 110c receiving a set of N basis vectors. It may be understood that the HSI data cube has been processed to compute the set of N basis vectors received at 110c, and may be dimensionally reduced based on the computation of the set of N basis vectors. As used herein, when referring to data or inputs associated with method 100, copies of the data, or associated iterations, may also be received that are associated with the data that has been processed or computed. In an embodiment, the processed HSI data cube received at 110b may comprise a 3D data cube with N coefficients per spatial pixel. Additionally, in some embodiments the set of N basis vectors may be orthonormal to one another, such as is described in U.S. patent application Ser. No. 13/085,883. Furthermore, it may be appreciated that a residual error per pixel may be included with the HSI data cube, or may otherwise also be received at 110.

In some embodiments, the set of N basis vectors received at 110c may be received pre-ranked. For example, the set of N basis vectors may be ranked in the order in which they were computed, wherein the order in which they are computed is significant. For example, in an embodiment, the basis vectors may be computed in order of their importance in describing the spectra of a single spatial pixel of the HSI image, or a cluster of nearby pixels. In such an embodiment, the basis vector coefficients formed by unmixing the set of basis vectors with the HSI image, may quantify the importance of the basis vector in describing the spectra of each pixel in the scene. In some embodiments, such as that illustrated, method 100 may include at 120 ranking the set of N basis vectors. For example, regardless of whether the basis vectors received at 110c are pre-ranked, method 100 may rank or rerank those basis vectors at 120. In an embodiment, the N basis vectors may be ranked based on their proximity to the average scene coefficient, which may be either the mean or the RMS, which may emphasize the average strength or power of the basis vector in the scene. In another embodiment, the average scene ranking may affect the order of the set of N basis vectors. In particular, the number of occurrences of each basis vector with a particular rank may be compared, which may facilitate selection and order of the set of N basis vectors associated with the average content of the scene. For example, the highest ranked basis vector may be the one whose coefficients are most commonly the largest. In some embodiments, the ranking of the basis vectors may be associated more directly with the processing of the HSI data cube. For example, where the processing utilizes PCA, the set of N basis vectors (or principal components), may be generated simultaneously, however may subsequently be ranked in any appropriate order, including, for example, being ranked according to the eigenvalues associated therewith.

Method 100 may continue at 130 by partitioning the processed HSI data cube into a set of N 2D images, the pixels of each 2D image showing the contribution of a basis vector to that pixel. Specifically, in an embodiment the value of each pixel in each 2D image may be the unmixing coefficient of that pixel's spectrum with the corresponding basis vector. As described herein, each of the 2D images may be characterized as "basis vector images" or "By images." In an embodiment, the partitioning at 130 may comprise projecting the processed HSI data cube onto each of the N basis vectors. It may be appreciated that by partitioning the HSI data cube, data that is formatted as Band Interleaved by Pixel ("BIP"), where each image contains a subset of the spatial data, with the all of the spectra or coefficients at each pixel of the subset, may be converted to a Band Sequential Image ("BSQ"), where each image has the entire set of spatial data, with a single spectral view or coefficient associated with that view of the spatial data.

Having partitioned the HSI data cube into the set of N BV images, method 100 may continue at 140 by comparing the error for each pixel with the maximum error mxe received at 110a. The relevant error is the total error associated with the complete set of the N BV images. It may be appreciated that in most cases, the initial error measured at 140 will be less than the maximum error mxe, as otherwise the data may not be further minimized in volume (as the minimization would only increase the error). In some embodiments, a warning of such, or a prompt to increase the maximum error mxe threshold, may be presented to the user in such a case. Regardless, if the measured error at 140 is not smaller than the maximum error mxe, then method 100 may proceed at 150 by setting aside pixels with errors greater than the maximum error mxe. If, however, the measured error is less than the maximum error mxe, then it may be understood that the data volume may be minimized further, to ascertain a smallest data volume possible within the maximum error level mxe. As such, method 100 may proceed at 160 by iteratively applying lossy compression of each of the N BV images, starting with the lowest remaining rank, utilizing the ranking established at 120 (or otherwise obtained when receiving the set of N basis vectors at 110c, returning to measure the error at 140 after each iteration to ascertain at what point the error exceeds the maximum error mxe. While in the illustrated embodiment, the iterative lossy compression of the lowest ranked basis vectors at 160 increasingly performs lossy compression of more of the basis vector images starting with the lowest ranked one, it may be appreciated that in other embodiments, lossy compression may be performed on all basis vector images, while the error may be measured by replacing the lossy compressed basis vector images with the uncompressed basis vector images associated with the highest ranked basis vectors, and continuously measuring the error until the error is less than the maximum error mxe at 140. Additionally, it may be appreciated that in the illustrated embodiment, once the error is no longer less than the maximum error mxe at 140, the last BV image that was compressed via lossy compression may be replaced with the associated decompressed BV image, so that the error does not exceed the maximum error mxe again. The iterative application of lossy compression is described in greater detail below.

In some embodiments, once the number of BV images that cannot be compressed through lossy compression is established (having the highest ranks from 120), those highest ranked BV images may be compressed through a lossless compression mechanism, which would accordingly not affect the error computation at 140. Accordingly, each of the images may be minimized in volume, where the overall error is less than the maximum error mxe. Regardless of how the compression versus the error is computed, once the data volume is minimized in light of the maximum error at 140, following the iterative application of lossy compression at 160, method 100 may set aside the pixels with errors greater than the maximum error mxe at 150. By setting aside, it may be understood that in some embodiments the pixels may be tagged, marked, or otherwise identified (i.e. by a processor performing the method) and/or may be cut, copied, or otherwise repackaged into an associated set of pixels. It may be appreciated that in an embodiment the pixels that are set aside may be designated by spatial location (i.e. in a BSQ format). Accordingly, a pixel map may be utilized to indicate which spatial pixels have been set aside across the entire spatial scene. In other embodiments, each BV image (in BSQ format) may include a designator of set aside pixels therein. Other mechanisms for designating the set aside pixels may be utilized in other embodiments.

Method 100 may then continue at 170 by outputting a set of N compressed BV images ("compressed BVIs"), as well as the set of N basis vectors. By outputting the set of N basis vectors, it may be appreciated that in some embodiments the N basis vectors may be simply made available for subsequent decompression. Additionally, a compression type indicator associated with either each of the N compressed BVIs, which may be either contained therein, or otherwise associated therewith, may also be output. In some embodiments, the compression type indicator may simply indicate whether each BVI is compressed with a lossy or lossless compression, while in other embodiments, such as where multiple types of lossy or lossless compression may be utilized, the compression type indicator may indicate which type of compression has been utilized for the compressed BVI.

In an embodiment, iteratively applying the lossy compression at 160, and computing the error at 140, may comprise selecting the lowest ranked BV image not already compressed using a lossy spatial compression, and spatially compressing that BV image with increasing ratios. At each ratio, the error may be recomputed, and compared to the maximum error mxe at 140. Until the maximum error mxe is reached at 140, then the largest error in any pixel not set aside may be tested, to determine whether the error due to compression is more than a certain amount greater than the largest pixel error in a prior compression step. In an embodiment, it is also possible to reserve space for set aside pixels, without yet determining which pixels will be set aside, since the relative error of the pixels will change as the lossy compression continues. In such an embodiment, rather than determining the largest error, the given percentile of error may be compared against the maximum error limit, mxe.

When the iterative application of lossy compression stops, the pixels with errors higher than the given percentile may be set aside in uncompressed form. In various embodiments, the certain amount may be a user input, or may be pre-established. Additionally, the amount may be quantified, or may be relative. For example, the amount may be a percentage relative to the prior worst case pixel error. If the worst case pixel error is greater than the certain amount over that of the prior compression, then compression of the BV image may stop, as an inflection point for the error curve of the BV, where the slope of the curve changes significantly, has been reached for the given basis vector. It may be appreciated that the inflection point may also be understood as a point of diminishing returns, where trying to do more compression yields less benefit in saving data volume, but costs more in increasing error or increasing set asides. Iteratively applying the lossy compression at 160, and computing the error at 140, may then continue by selecting the next lowest ranked BV image, and repeating until either all BV images have been compressed to the ratio associated with their inflection points, or until the maximum error mxe is reached. If the maximum error level mxe has still not been reached for those BV images that have been compressed to their inflection points, then iteratively applying the lossy compression at 160, and computing the error at 140 may continue by selecting the lowest ranked BV image, and further compressing that image by a certain incremental step, and testing the error to see if the maximum error mxe has been reached.

It may be appreciated that because the error in each pixel may be calculated using the complete set of BV images, instead of on a per image basis, the error results for each pixel may be stored, and the additional error due to the latest lossy compression step may be added to the stored results. In some embodiments, the incremental step may be established, or may be received as a user-input. In an embodiment, another threshold may be utilized (or received as a user input), to partially increase the compression of each of the BV images that have been compressed to their inflection points without reaching the maximum error mxe, without fully compressing just the lowest ranked BV image. For example, in an embodiment where the incremental step is 0.25×, and the threshold is 2×, then the further compression of each image may be in steps of 0.25× up to 2× beyond the inflection points, whereby error is tested at each step thereof, repeating the compressions until each image has been further compressed by 2×. In some embodiments, the further compression may continue again, either by the same incremental step and threshold, or by another (again either pre-determined or received by user input), until the error level is ultimately exceeded. While the inflection point parameter may identify when further compression of a low ranked BV image will probably be less efficient than starting to compress a higher ranked image, in some embodiments it may be possible to evaluate the increase in error and decrease in data volume for the first step of the next highest ranked BV image, and use that information to determine when the lossy compression of the lower ranked image is no longer efficient.

Figure 2:
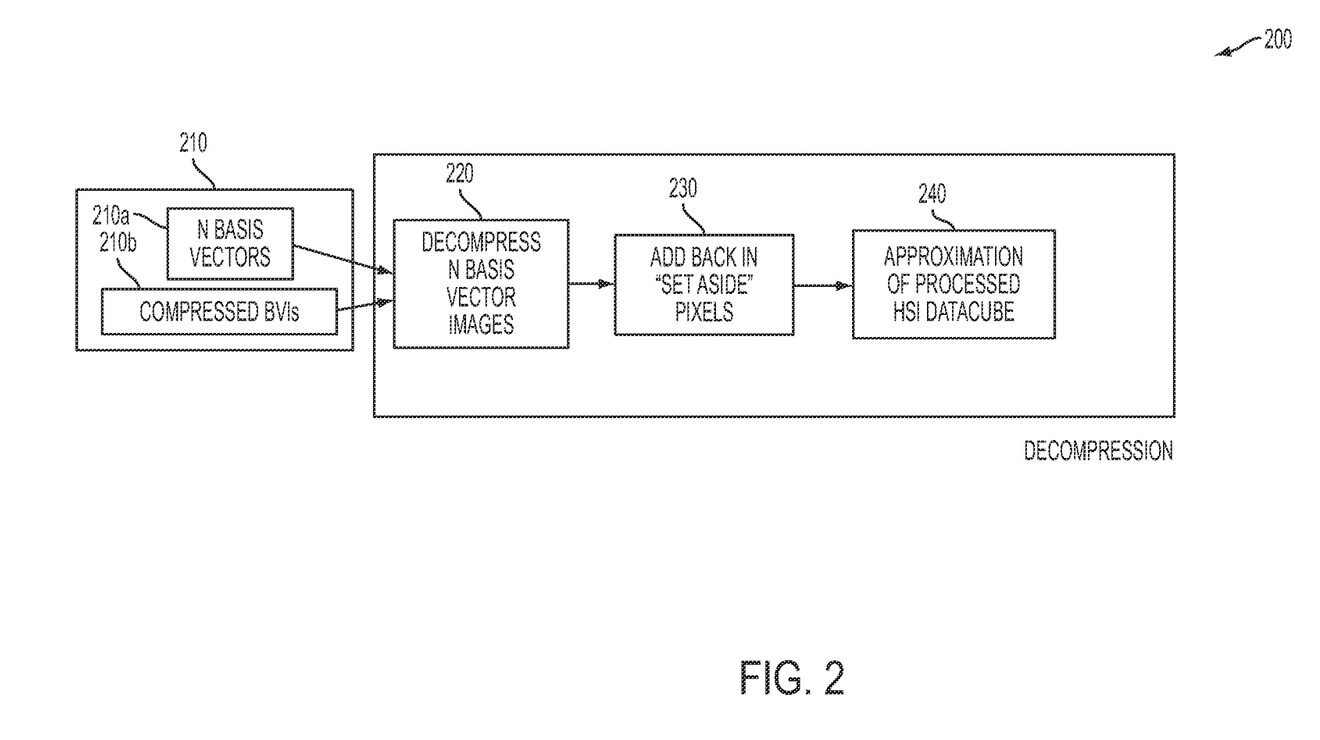
FIG. 2 illustrates an embodiment of a method for decompressing compressed dimensionally reduced data with set aside pixels.

It may be appreciated that the N compressed BVIs, the set of N basis vectors, and the compression type indicator for each image, output at 170, as well as the set-aside pixels in some embodiments, may be stored at any appropriate location, or may be transmitted elsewhere in the system performing method 100, or to a system remote from that performing method 100. For example, where method 100 is performed on a platform performing the HSI imaging, the outputs from 170 may be transmitted to an analysis system, where it may be subsequently decompressed, and accessed for analysis. FIG. 2 illustrates an embodiment of a method 200 for decompressing the compressed BVIs. Specifically, in some embodiments method 200 may begin at 210 by receiving inputs associated therewith. It may be appreciated that in various embodiments the inputs received at 210 may be obtained from data files stored locally on a system associated with performing method 200, or may be stored remotely, such as on another system (including the system that performed method 100). While in some embodiments all inputs received at 210 may be received simultaneously, in other embodiments, the inputs received at 210 may be received at various times throughout method 200, and may be called as needed, or a prompt requesting a user input may be presented via the user interface at various times while performing the method 200.

As shown in FIG. 2, in an embodiment receiving the inputs at 210 may include at 210a receiving the set of N compressed BVIs. Receiving the inputs at 210 may also include at 210b receiving the set of N basis vectors associated with the set of compressed BVIs. Once the inputs are received at 210, method 200 may continue at 220 by decompressing the N compressed BVIs. It may be appreciated that such decompressing at 220 may comprise utilizing the compression type indicator associated with each of the compressed BVIs (which may also be received at 210), to decompress each compressed BVI with the associated lossy compression. In some embodiments, decompressing at 220 may include combining the uncompressed images into a BSQ format 3D image, and transforming the 3D image into BIP format. Having decompressed each of the compressed BVIs, method 200 may continue at 230 by reincorporating the set-aside pixels that were left uncompressed in method 100. It may be appreciated that by recombining the set aside pixels at 230, an approximation of the processed HSI data cube may be outputted at 240. The approximation of the HSI data cube would suffer some degradation from the original processed HSI data cube received at 110b, as the data lost during the lossy compression of method 100 would not be recreated, however, the compression of method 100 would ensure that only less significant data would be compressed through the lossy compression.

Figure 3:
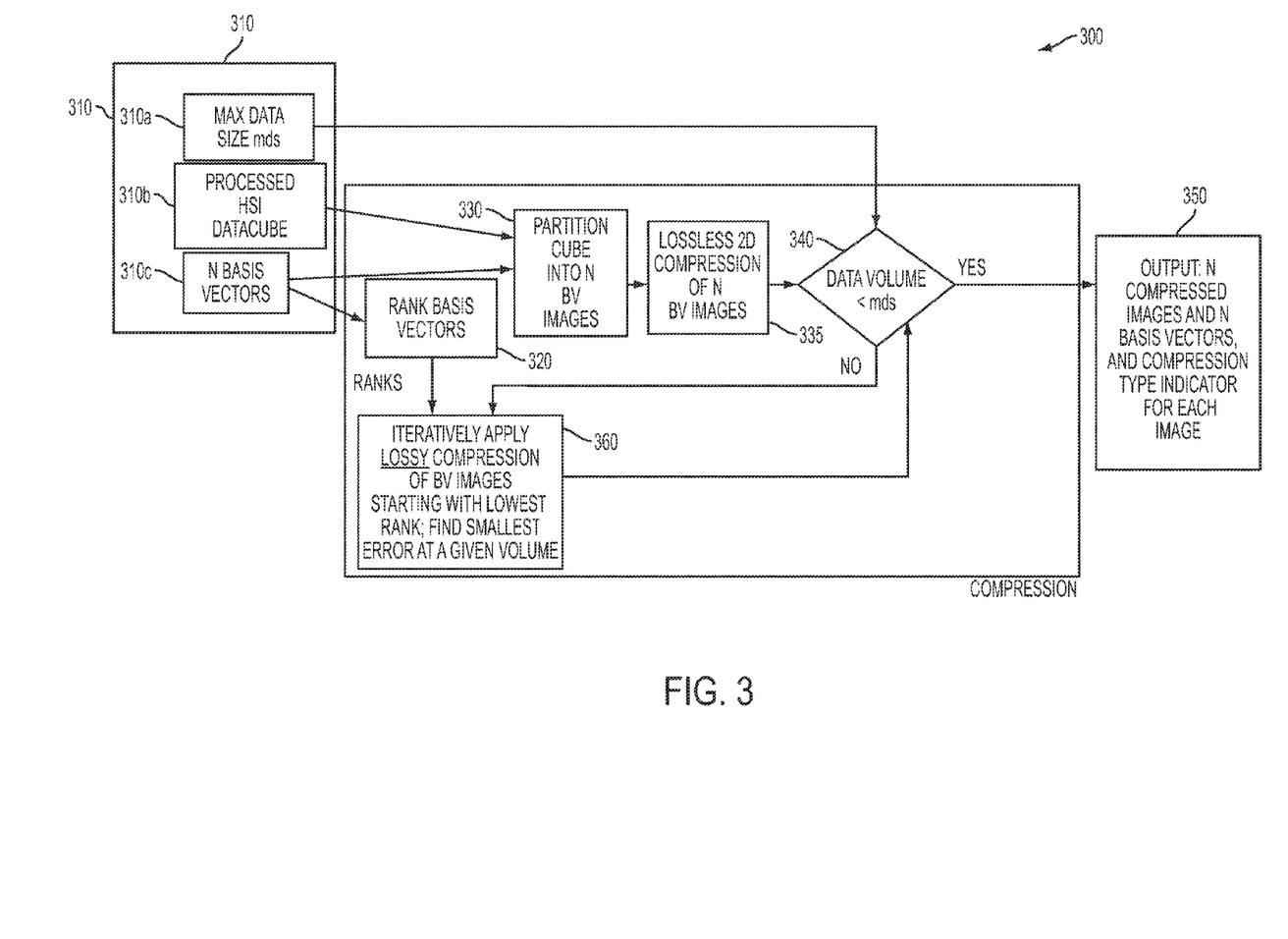
FIG. 3 illustrates an embodiment of a method for compressing dimensionally reduced data associated with a hyperspectral image, minimizing an error level based on a maximum data size.

As indicated above, in some embodiments methods of the present disclosure may be configured to reduce the size of the DIMRED data into compressed data having a selected data size. Accordingly, FIG. 3 depicts an embodiment of method 300 configured to package the DIMRED data in a smaller compressed format, where the error of the data compressed into the smaller format is minimized while the data itself is preserved within a user-selected maximum data size mds. Accordingly, in some embodiments method 300 may begin at 310 by receiving inputs associated therewith. As with method 100, in various embodiments the inputs received at 310 may be obtained from data files stored locally on a system associated with performing method 300, or may be stored remotely, such as on another system. In some embodiments, the inputs received at 310 may be received by a user interface associated with the system associated with performing the method 300, or may be received at a user interface on a remote system interfaced with the system performing the method 300. While in some embodiments all inputs received at 310 may be received simultaneously, in other embodiments, the inputs received at 310 may be received at various times throughout method 300, and may be called as needed, or a prompt requesting a user input may be presented via the user interface at various times while performing the method 300.

As shown in FIG. 3, in an embodiment receiving the inputs at 310 may include at 310a receiving the maximum data size mds. The maximum data size mds may be input utilizing any appropriate measurement, including but not limited to being measured in bits, bytes, or another appropriate quantum of data measurement, or may be input as a percentage of data size of the DIMRED data. Other inputs for the maximum data size mds may alternatively be utilized in other embodiments. Receiving the inputs at 310 may also include at 310b receiving a processed HSI data cube comprising the DIMRED data, and at 310c receiving a set of N basis vectors. As above, it may be understood that the HSI data cube has been processed to compute the set of N basis vectors received at 310c, and may be dimensionally reduced based on the computation of the set of N basis vectors. As used herein, when referring to data or inputs associated with method 300, copies of the data, or associated iterations, may also be received, that are associated with the data that has been processed or computed. In an embodiment, the processed HSI data cube received at 310b may comprise a 3D data cube with N coefficients per spatial pixel. Additionally, in some embodiments the set of N basis vectors may be orthonormal to one another, such as is described in U.S. patent application Ser. No. 13/085,883. Furthermore, it may be appreciated that a residual error per pixel may be included with the HSI data cube, or may otherwise also be received at 310.

In some embodiments, the set of N basis vectors received at 310c may be received pre-ranked. For example, the set of N basis vectors may be ranked in the order in which they were computed, wherein the order in which they are computed is significant. For example, in an embodiment, the basis vectors may be computed in order of their importance in describing the spectra of a single spatial pixel of the HSI image, or a cluster of nearby pixels. In such an embodiment, the basis vector coefficients formed by unmixing the set of basis vectors with the HSI image, may quantify the importance of the basis vector in describing the spectra of each pixel in the scene. In some embodiments, such as that illustrated, method 300 may include at 320 ranking the set of N basis vectors. For example, regardless of whether the basis vectors received at 310c are pre-ranked, method 300 may rank or rerank those basis vectors at 320. In an embodiment, the N basis vectors may be ranked based on their proximity to the average scene coefficient, which may be either the mean or the RMS, which may emphasize the average strength or power of the basis vector in the scene. In another embodiment, the average scene ranking may affect the order of the set of N basis vectors. In particular, the number of occurrences of each basis vector may be compared with a particular rank, which may facilitate selection and order of the set of N basis vectors associated with the average content of the scene. In some embodiments, the ranking of the basis vectors may be associated more directly with the processing of the HSI data cube. For example, where the processing utilizes PCA, the set of N basis vectors (or principal components), may be generated simultaneously, however may subsequently be ranked in any appropriate order, including, for example, being ranked according to the eigenvalues associated therewith.

Method 300 may continue at 330 by partitioning the processed HSI data cube into a set of N 2D images, the pixels of each 2D image showing the contribution of a basis vector to that pixel. In an embodiment, partitioning the data cube at 330 may be similar to the partitioning at 130 described in method 100. For example, each of the 2D images may be composed of the unmixing coefficients of each pixel spectrum with each basis vector. These unmixing coefficients may be chosen to best recreate the spectrum of each pixel as a linear combination of the basis vectors. As described herein, each of the 2D images may be characterized as "basis vector images" or "BV images." In an embodiment, the partitioning at 330 may comprise projecting the processed HSI data cube onto each of the N basis vectors. It may be appreciated that by partitioning the HSI data cube, data that is formatted as BIP may be converted to a BSQ format, as described above.

Having partitioned the HSI data cube into the set of N BV images, method 300 may continue at 335 by performing a lossless 2D compression of each of the set of N images. Such lossless compression may vary across embodiments, however in one non-limiting embodiment may include the lossless mode of JPEG-2000. In another embodiment, the lossless compression may include that described in Donald J. Healy, "Lossless compression: the Rice alternative to JPEG," Proc. SPIE 3431, 194 (1998), incorporated herein in its entirety by reference. It may be appreciated that if, through lossless compression of the N BV images, a data size of the compressed BV images resulting therefrom is less than the maximum data size mds, then the error would be zero, and lossy compression to further reduce the data size would be unnecessary. As such, method 300 may proceed at 340 by comparing the data size of the set of the N BV images with the maximum data size mds received at 310a. If the measured data size of the compressed BV images at 340 is smaller than the maximum data size mds, then method 300 may proceed at 350 by outputting the N compressed BV images ("compressed BVIs"), as well as the set of N basis vectors, and a compression indicator for each image (specifically, indicating that the images have been compressed by lossless compression, and which type of lossless compression). If, however, the measured data size is greater than the maximum data size mds, then it may be understood that a lossy compression (increasing the error) should be applied to allow the data volume to be minimized further. As such, method 300 may proceed at 360 by iteratively applying lossy compression of each of the N BV images, starting with the lowest rank, utilizing the ranking established at 320 (or otherwise obtained when receiving the set of N basis vectors at 310c) returning to measure the data volume at 340 after each iteration to ascertain the smallest error at a given volume. While in the illustrated embodiment, the iterative lossy compression associated with the lowest ranked basis vectors at 360 increasingly performs lossy compression of more of the basis vector images starting with the lowest ranked one, it may be appreciated that in other embodiments, lossy compression may be performed on all basis vector images, while the error may be measured by replacing the lossy compressed basis vector images with the losslessly compressed basis vector images, starting with those associated with the highest ranked basis vectors. The iterative application of lossy compression at 360 is described in greater detail below.

In some embodiments, once the smallest number of BV images that are to be compressed through lossy compression is established (having the lowest ranks from 320), method 300 may also continue at 350 by outputting the set of N compressed BVIs, as well as the set of N basis vectors. As above, by outputting the set of N basis vectors, it may be appreciated that in some embodiments the N basis vectors may be simply made available for subsequent decompression. Additionally, a compression type indicator associated with either each of the N compressed BVIs, which may be either contained therein, or otherwise associated therewith, may also be output. In some embodiments, the compression type indicator may simply indicate whether each BVI is compressed with a lossy or lossless compression, while in other embodiments, such as where multiple types of lossy or lossless compression may be utilized, the compression type indicator may indicate which type of compression has been utilized for each compressed BVI.

In an embodiment, iteratively applying the lossy compression at 360, and computing the data size at 340, may comprise selecting the lowest ranked BV image not already compressed using a lossy spatial compression, and spatially compressing that BV image with increasing ratios. At each ratio, the method 300 may test if the data size has been reduced to less than the maximum data size mds. If so, then the compressed BVIs may be output at 350. If not, then the error in the worst case pixel may be tested, to determine whether the error due to compression is more than a certain amount greater than the worst case pixel error in a prior compression step. In various embodiments, the certain amount may be a user input, or may be pre-established. Additionally, the amount may be quantified, or may be relative. For example, the amount may be a percentage relative to the prior worst case pixel error. If the worst case pixel error is greater than the certain amount over that of the prior compression, then compression of the BV image may stop, as the optimal point of compression and resulting error has been reached for the given basis vector (i.e. the inflection point). Iteratively applying the lossy compression at 360, and computing the error at 340, may then continue by selecting the next lowest ranked BV image, and repeating until either all BV images have been compressed to the ratio associated with their inflection point, or until the volume has been compressed below the maximum data size mds.

Figure 4:
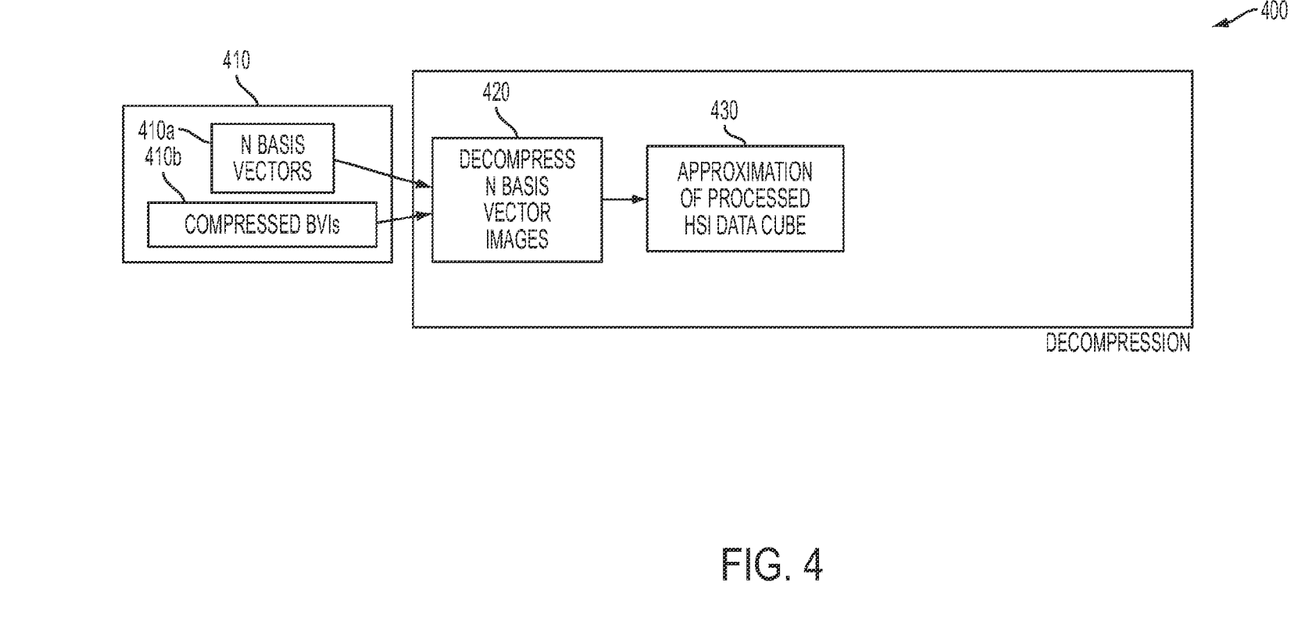
FIG. 4 illustrates an embodiment of a method for decompressing compressed dimensionally reduced data.

It may be appreciated that the N compressed BVIs, the set of N basis vectors, and the compression type indicator for each image, output at 350, may be stored at any appropriate location, or may be transmitted elsewhere in the system performing method 30, or to a system remote from that performing method 30. For example, where method 30 is performed on a platform performing the HSI imaging, the outputs from 350 may be transmitted to an analysis system, where it may be subsequently decompressed, and accessed for analysis. FIG.

4 illustrates an embodiment of a method 400 for decompressing the compressed BVIs. Specifically, in some embodiments method 400 may begin at 410 by receiving inputs associated therewith. It may be appreciated that in various embodiments the inputs received at 410 may be obtained from data files stored locally on a system associated with performing method 400, or may be stored remotely, such as on another system (including the system that performed method 300). While in some embodiments all inputs received at 410 may be received simultaneously, in other embodiments, the inputs received at 410 may be received at various times throughout method 400, and may be called as needed, or a prompt requesting a user input may be presented via the user interface at various times while performing the method 400.

As shown in FIG. 4, in an embodiment receiving the inputs at 410 may include at 410a receiving the set of N compressed BVIs. Receiving the inputs at 410 may also include at 410b receiving the set of N basis vectors associated with the set of compressed BVIs. Once the inputs are received at 410, method 400 may continue at 420 by decompressing the N compressed BVIs. It may be appreciated that such decompressing at 420 may comprise utilizing the compression type indicator associated with each of the compressed BVIs (which may also be received at 410), to decompress each compressed BVI with the associated lossy compression. In some embodiments, decompressing at 420 may include combining the uncompressed images into a BSQ format 3D image, and transforming the 3D image into BIP format. Having decompressed each of the compressed BVIs, method 400 may continue at 430 by outputting an approximation of the processed HSI data cube. The approximation of the HSI data cube would suffer some degradation from the original processed HSI data cube received at 310b, as the data lost during the lossy compression of method 300 would not be recreated, however, the compression of method 300 would ensure that only less significant data would be compressed through the lossy compression.

In various embodiments the methods described herein may be performed on any number of hyperspectral imaging systems, or on any computing systems configured to receive hyperspectral imagery and/or the DIMRED data associated therewith. The hyperspectral image may be received from any source, on any platform. For example, in some embodiments the hyperspectral image may be obtained from a space based satellite, airplane, or other elevated imaging system. Additionally, in some embodiments the hyperspectral image and/or the DIMRED data may be processed to characterize targets or materials in the imaged scene, or detect changes between various different hyperspectral images captured, or perform other analytics thereon. The hyperspectral imaging system or other computing system performing the methods disclosed herein may contain or otherwise provide a front end interface for one or more local processors associated with the imaging system. In some embodiments, the one or more processors may be configured to analyze the reduced data set for the hyperspectral image prior to compression, or may perform additional dimensionality reduction or compression techniques on the hyperspectral image prior to implementing the compression techniques disclosed herein. As indicated above, in some embodiments, a system configured to perform the compression and/or decompression described herein may additionally be configured to perform the initial DIMRED of the hyperspectral image, wherein the compressed data can be communicated rapidly to a remote station, which may be a ground station or other remote location where the data set can be decompressed for further processing, including but not limited to target detection.

Although in various embodiments the DIMRED or compression methods utilized or described herein may be implemented on any appropriate system or hardware, in some embodiments, the methods may be implemented on a computer system, which may generally include typical computer components such as one or more processors, memory modules, storage devices, input and output devices, and so on. In an embodiment, such systems may be maintained in an active memory of the computer system to enhance speed and efficiency, and may further be coupled to a computer network and utilize distributed resources associated with the computer network. In various embodiments, systems operating the methods may include one or more interfaces, one or more spectrum readers, and one or more modules that may perform establishing the BV set, decomposing the hyperspectral image, evaluating the hyperspectral image, and performing post-processing of the DIMRED data. In some embodiments, the one or more interfaces may be configured to receive data corresponding to one or more hyperspectral images, one or more BVs provided by a user, an indication as to whether dimensionality reduction is to be performed as a lossy or lossless operation, tolerance levels for the amount of lost data in the dimensionality reduction, and/or other information relating to the processing of hyperspectral images. In an embodiment, the one or more interfaces may be arranged to receive information directly from the user via an input device associated with the system performing the DIMRED and/or compression methods, or directly from a component of the system or systems. Systems configured to perform the decompression may be similarly configured in some embodiments.

According to an embodiment, implementations of the various systems and methods for compressing the HSI data cubes described herein may be made in hardware, firmware, software, or various combinations thereof. For example, the systems and methods for reducing dimensionality of hyperspectral images may be implemented as computer executable instructions stored on a non-transitory machine readable storage medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

The invention claimed is:

1. A computer implemented method for compressing 3D hyperspectral image data having a plurality of spatial pixels associated with a hyperspectral image, and a number of spectral dimensions associated with each spatial pixel, the method comprising:
   receiving, using a processor, the 3D hyperspectral image data, a set of basis vectors associated therewith, and a maximum error amount;
   partitioning, using the processor, the 3D hyperspectral image data into a plurality of 2D images, each associated with one of the number of spectral dimensions, and an associated one of the set of basis vectors;
   ranking, using the processor, the set of basis vectors if not already ranked;
   iteratively applying a lossy compression to the plurality of 2D images using the processor, starting with 2D images associated with a lowest ranked basis vector, as compressed 2D images;
   comparing, using the processor, an error associated with the compressed 2D images with the maximum error amount, to maximize an amount of volume compression within the maximum error amount;
   setting aside, using the processor, pixels of the 2D images with errors exceeding the maximum error amount;
   wherein iteratively applying the lossy compression to the plurality of 2D images comprises measuring error in a worst case pixel associated with each of the plurality of 2D images and comparing the error in the worst case pixel associated with one of the plurality of 2D images in a current iteration to the error in a worst case pixel associated with one of the plurality of 2D images in a prior iteration; and
   wherein said comparing the error comprises testing whether the error in the worst case pixel in the current iteration is more than a user-determined amount greater than the error in the worst case pixel in the prior iteration.

2. The method of claim 1, further comprising designating a compression type indicator associated with one or more of the compressed 2D images.

3. The method of claim 2, further comprising outputting a set of the compressed 2D images, the compression type indicators associated therewith, and the set of basis vectors.

4. The method of claim 1, wherein the set of basis vectors are ranked based on an order of their discovery.

5. The method of claim 1, wherein the set of basis vectors are ranked based on a comparison to an average measurement of a scene associated with the spatial pixels.

6. The method of claim 1, wherein the set of basis vectors are statistically derived or geometrically derived.

* * * * *